United States Patent [19]
Brandt

[11] 4,215,390
[45] Jul. 29, 1980

[54] WARNING LIGHT
[75] Inventor: Ivan L. Brandt, Milwaukee, Wis.
[73] Assignee: J. W. Speaker Corporation, Milwaukee, Wis.
[21] Appl. No.: 972,813
[22] Filed: Dec. 26, 1978
[51] Int. Cl.² ............................................. F21V 3/00
[52] U.S. Cl. ................................... 362/311; 362/361; 362/363
[58] Field of Search ................ 362/260, 363, 361, 311

[56] References Cited
U.S. PATENT DOCUMENTS
3,308,290  3/1967  Brown .................................. 362/260

Primary Examiner—Stephen J. Lechert, Jr.

[57] ABSTRACT

An improved warning light includes a flashing strobe light bulb and a plastic lens which has incorporated in the plastic material an effective amount of a fluorescent material such as a dye or pigment, which converts the radiation emitted by the strobe light to the preferred wave length of the fluorescent material. In a preferred embodiment, especially suited for use as a warning light on vehicles, the strobe light is surrounded by a cylindrical lens of polycarbonate or acrylic plastic which has the fluorescent dye incorporated therein and the bulb and the lens are protected from the elements by a transparent dome.

10 Claims, 3 Drawing Figures

WARNING LIGHT

The present invention relates generally to warning lights, and, more particularly, to warning lights which employ flashing strobe lights as a light source.

Flashing strobe lights, or as they are more accurately named capacitor flash lights, consist essentially of a source of high voltage direct current, a storage capacitor and an arc discharge charge flash tube or bulb containing an inert gas, such as xenon. The capacitor is charged by the direct current source and it is substantially discharged through the gas filled arc discharge flash tube or bulb to produce a flash of high intensity light. The xenon arc discharge tube's characteristic radiation is near 4400 A° and when it is enclosed in a quartz envelope it radiates heavily in the near ultraviolet range (circa 3500 A°). This ultraviolet radiation comprises nearly 50% of the total light output. The human eye sensitivity and/or response attenuates near the blue to violet band (3500 A° to 4500 A°). However, the same sensitivity is enhanced over or above these wavelengths.

In the past, there have been attempts to improve the visible light output of strobe light equipped warning lights by converting the wavelength of the radiation of the strobe light into wavelengths more visible to the human eye. These attempts have included applying a coating of fluorescent dye to the bulb; coating the inside or outside of a lens or a protective dome with such material or filling the bulb with a phosphor type of gas. However, none of these past attempts have produced completely satisfactory results.

SUMMARY OF THE INVENTION

It has now been discovered that the visible light output of a flashing strobe light can be increased by employing in combination with said light a lens of plastic which has incorporated therein an effective amount of a fluorescent material such as a dye or pigment which converts the radiation emitted by the strobe light to the preferred wavelength of the fluorescent material.

As previously stated, the characteristic radiation of an xenon tube equipped strobe light is near 4400 A° and it radiates heavily in the near ultraviolet range (circa 3500 A°). The human eye sensitivity and/or response attenuates near the blue to violet band (3500° A to 4500° A). However, this same sensitivity is enhanced over or above these wavelengths.

The function of the fluorescent pigment or dye is to convert all radiation emitted to its preferred wavelength (red, yellow, etc.). The more energetic or closer to ultraviolet the light radiation is the higher the conversion efficiency or more converted light as red, yellow, etc. will be produced. So while the near invisible light produced by the xenon lamp is most energetic, and contributes most markedly to the dye induced light conversion a significant amount of visible light is also converted.

The results obtained when the fluorescent material is incorporated in the plastic of the lens are superior to the results obtained by coating the inside or the outside of a lens with the same material. The results are also superior to those obtained when the fluorescent material is incorporated into the plastic of the protective dome. It appears that incorporating the fluorescent material into the plastic of the lens results in a more effective distribution of the fluorescent material and that the prisms of the lens reflect the light generated by the xenon flash tube, and in effect cause this reflected light to "bounce" back and forth between prisms. At each bounce, the light converts more of its energy to the lower preferred radiation of the dye or pigment. The result is more light output of the preferred wavelength of the fluorescent material.

DESCRIPTION OF THE PREFERRED EMBODIMENT

Figure 1:
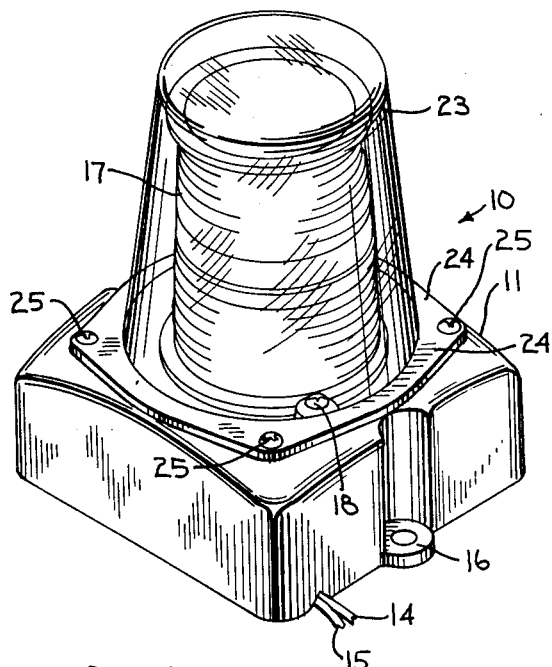
FIG. 1 is a perspective view showing a warning light embodying the present invention.

In FIG. 1 of the drawings, there can be seen a warning light generally referred to as 10, which is of the type particularly adapted for use on a vehicle such as a truck or forklift. As seen best in FIG. 2, the light 10 includes a base 11 having a socket 12 in which an arc discharge tube or bulb 13 is positioned. The base 11 is hollow and it contains the electrical circuit and components for the warning light 10. A suitable circuit is disclosed in U.S. Pat. No. 3,024,386.

Figure 2:
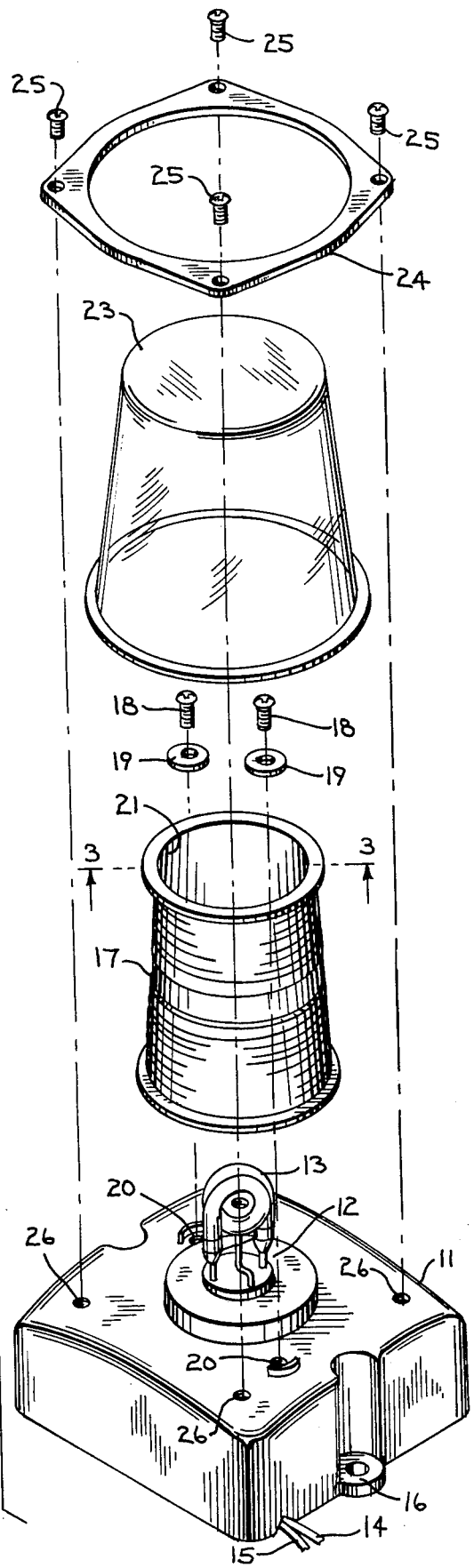
FIG. 2 is an exploded view showing the various components of the warning light.

As seen in FIGS. 1 and 2, a pair of insulated connectors 14 and 15 are provided for connecting the electrical components within the base 11 to a power source (not shown). The base 11 has a pair of recessed mounting lugs 16, only one of which is shown, for mounting the warning light to a vehicle.

The arc discharge tube or flash light 13 is a glass or quartz tube filled with an inert gas such as xenon, krypton, or argon gas or a mixture of such gases. Suitable arc discharge tubes or flash lights are commercially available as such lights have been used for many years for photographic and stroboscopic purposes.

Figure 3:
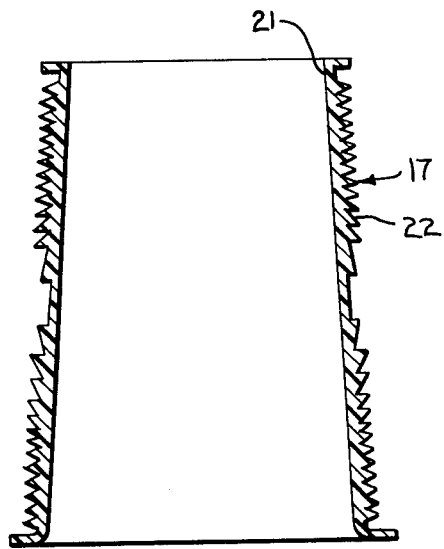
FIG. 3 is a sectional view of the lens taken along the line 3—3 in FIG. 2.

In the embodiment of the warning light seen in FIGS. 1 and 2, there is a cylindrical lens 17 which is positioned about the tube 13. The lens 17 is secured to the base 11 with a pair of threaded fasteners 18 and washers 19 which engage threaded openings 20 in the base 11. As seen only in FIG. 3, the lens 17 has a smooth inner wall 21 and an outer wall 22 which is designed to optically modify the visible light emitted from the bulb 13.

The lens 17 is preferably made of transparent plastic and is formed by injection molding.

Returning to FIG. 1, it can be seen that the lens 17 and arc discharge tube 13 are protected from the elements by a protective dome 23. As seen in FIG. 2, a collar 24 and threaded fasteners 25 cooperate with threaded openings 26 in the base 11 to secure the dome 23 to the base 11 in a weatherproof manner.

Although other plastic materials may be used as the material for the lens 17 and dome 23, the plastics known as polycarbonates and acrylics are especially preferred. Suitable polycarbonate resins include those commercially available under the trademark LEXAN from the General Electric Company, and the trademark MERLON from the Mobay Chemical Company. Suitable acrylic resins include those commercially available under the trademarks LUCITE from E. I. DuPONT DE NEMOURS & CO. and PLEXIGLAS from ROHM & HAAS.

The fluorescent materials which are preferred for use in the present invention are those dyes and pigments which can be incorporated into the plastic material prior to the injection molding of the lens and which will convert the radiation emitted by the arc discharge light to the preferred wavelength of the fluorescent material which is more visible to the human eye.

The term "fluorescent" as used in the specification and claims includes not only those materials that luminesce when excited by the radiation of the arc discharge light, but also those that may be considered phosphorescent, i.e., which continue to glow after the excitation has ceased. Such flourescent materials are generally all solid and liquid, inorganic or organic materials that are able to convert absorbed radiation from the strobe light to its preferred wavelength, e.g., red, yellow, etc. Preferred materials are those which are sensitive to the 3500 A° to 4500 A° radiation emanating from a light source. Representative materials include the organic fluorescent pigments generally known as aminoketones and thioindigos. Mohawk yellow D-299 available from Dayglo Corp. of Cleveland, Ohio is an aminoketone and Hostasol Red-5B available from American Hoescht Corp. of Coventry, R.I. is a thioindigo. Additional, suitable materials are available in yellow, blue, green and red and are disclosed in numerous U.S. patents including U.S. Pat. No. 3,276,216 and U.S. Pat. No. 3,928,226.

The fluorescent material is added to the plastic in an amount ranging from about 0.01% to about 1.0% by weight of the plastic. The preferred amount is 0.2% for Mohawk D-299. The exact amount to be employed, of course, will vary to some extent with the fluorescent material and the plastic employed and the results desired.

In the preferred practice of the invention, the fluorescent material is added to the plastic resin with mixing to form a uniform mixture and the lens is then formed by injection molding employing conventional times, pressures, temperatures and equipment.

The practice of the present invention is further illustrated by reference to the following example.

EXAMPLE

To 100 lbs. of acrylic resin (Plexiglas, Rohm & Haas) was added 0.2 lbs. of a fluorescent material (Mohawk Yellow D-299, Dayglo Corp.) The two ingredients were mixed for 15 minutes to obtain a uniform mixture. The resulting mixture was fed into a hopper of a New Britain injection molding apparatus and lenses made using a pressure of 9000 psi and a temperature of 490° F. A lens was made every 35 seconds. The resulting transparent lenses were yellow in color. The effective light output of a warning light equipped with an arc discharge light and a lens prepared as described in the example was greater than that of an identical warning light having a lens which did not include the fluorescent material.

It will be readily apparent to those skilled in the art that a number of changes and modifications can be made without departing from the spirit and scope of the present invention. For example, although the lens shown in the drawing is cylindrical, the lens may be shaped differently for other applications. Furthermore, although the lens has been described as transparent, it is to be understood that the lens may be translucent provided that such a lens is satisfactory for the intended use. Therefore, the term "transparent" as used in the specification and the claims to describe the lens is intended to cover both transparent and translucent lenses.

I claim:

1. A lens especially adapted for increasing the effective light output of a flashing strobe light, said lens being formed of a plastic material which has incorporated therein an effective amount of a fluorescent material which converts the radiation emitted by the flashing strobe light to the wavelength of the fluorescent material.

2. The lens of claim 1 in which the lens is formed of a plastic selected from polycarbonate plastic and acrylic plastic.

3. The lens of claim 2 in which the fluorescent material is present in an amount ranging from about 0.01% to about 1.0% by weight of the plastic.

4. A warning light which includes:
 (a) a base having a socket with an arc discharge tube mounted therein;
 (b) a cylindrical plastic lens positioned about the arc discharge tube, said lens having incorporated in the plastic material an effective amount of a fluorescent material which converts the radiation emitted by the arc discharge tube to the wavelength of the fluorescent material; and
 (c) a transparent protective dome which surrounds the lens and the arc discharge tube and forms a weather tight seal with the base to protect the tube and the lens from the environment.

5. The warning light of claim 4 in which the lens is made of a plastic selected from polycarbonate resin and acrylic resin.

6. The warning light of claim 4 in which the lens has incorporated therein about 0.01% to about 1.0% by weight of the fluorescent material.

7. The warning light of claim 4 in which the lens is of polycarbonate plastic and it has incorporated therein about 0.01% to about 1.0% of the fluorescent material.

8. The warning light of claim 4 in which the lens is of acrylic plastic and it has incorporated therein about 0.01% to about 1.0% of the fluorescent material.

9. In a warning light of the type which includes an arc discharge bulb and a lens for said bulb, the improved lens which is comprised of plastic selected from polycarbonate plastic and acrylic plastic which has incorporated therein a effective amount of a fluorescent material which converts the radiation emitted by the arc discharge bulb to the wavelength of the fluorescent dye or pigment.

10. The warning light of claim 9 in which the fluorescent material is present in an amount of about 0.01% to about 1.0% by weight of the plastic.

* * * * *